United States Patent
Wakao et al.

(10) Patent No.: US 7,147,094 B2
(45) Date of Patent: Dec. 12, 2006

(54) DRIVE POWER TRANSMISSION CONTROL DEVICE

(75) Inventors: Hisaaki Wakao, West Bloomfield, MI (US); Tatsuya Inagaki, Kariya (JP); Yutaka Mori, Toyota (JP); Susumu Koike, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 158 days.

(21) Appl. No.: 10/886,652

(22) Filed: Jul. 9, 2004

(65) Prior Publication Data

US 2005/0064989 A1 Mar. 24, 2005

(30) Foreign Application Priority Data

Jul. 9, 2003 (JP) ............................ 2003-194370
Oct. 28, 2003 (JP) ............................ 2003-367384

(51) Int. Cl.
*F16D 27/115* (2006.01)
(52) U.S. Cl. ............... 192/84.1; 180/249; 192/113.23; 361/694
(58) Field of Classification Search ................ None
See application file for complete search history.

(56) References Cited

U.S. PATENT DOCUMENTS 4,937,750 A * 6/1990 Gilliam ....................... 701/69
5,732,790 A * 3/1998 Endo et al. ................. 180/444
6,141,217 A * 10/2000 Nakahama et al. ......... 361/690
2003/0109356 A1 6/2003 Shigeta et al.
2004/0239195 A1* 12/2004 Okamura et al. ......... 310/68 D

FOREIGN PATENT DOCUMENTS

| JP | 2002-340054 | 11/2002 |
|---|---|---|
| JP | 2003-136989 | 5/2003 |
| WO | WO 01/85484 A1 * | 11/2001 |

* cited by examiner

*Primary Examiner*—Rodney H. Bonck
(74) *Attorney, Agent, or Firm*—Oblon, Spivak, McClelland, Maier & Neustadt, P.C.

(57) ABSTRACT

A drive power transmission control device is provided with an electromagnetic drive power transmission device and an ECU for controlling the application of electric current to an electromagnetic coil of the drive power transmission device. The ECU is bodily provided on a casing of the electromagnetic type drive power transmission device through at least one support member 50. The electronic control device is fixedly supported on an outer wall of the casing with a space between the electronic control device and the casing, such that cooling air can flow between the outer wall of the casing and the electronic control device.

3 Claims, 13 Drawing Sheets

DRIVE POWER TRANSMISSION CONTROL DEVICE

INCORPORATION BY REFERENCE

This application is based on and claims priority under 35 U.S.C. sctn. 119 with respect to Japanese Applications No. 2003-194370 filed on Jul. 9, 2003 and No. 2003-367384 filed Oct. 28, 2003, the entire contents of which are incorporated herein by reference.

BACKGROUND OF THE INVENTION

1. Field of the Invention

The present invention relates to a drive power transmission control device for a front-and-rear wheel drive vehicle.

2. Discussion of the Related Art

Heretofore, as drive power transmission control devices of this kind, there has been known one which is described in Japanese unexamined, published patent application No. 2002-340054. The known control device is provided with an electromagnetic type drive power transmission device which contains in a casing a clutch mechanism for transmitting the drive power transmitted from an engine to either pair of front and rear wheels, to the remaining pair of the wheels and an electromagnetic coil for controlling the torque transmitted by the clutch mechanism. The control device is further provided with an electronic control device for controlling the electric current flow to the electromagnetic coil of the electromagnetic type drive power transmission device.

More specifically, the drive power transmission control device is incorporated in a four-wheel drive vehicle M, as shown in FIG. 9, and is provided with an electromagnetic type drive power transmission device 2 capable of varying the transmission torque which connects right and left front wheels Wfr, Wfl driven by an engine 1 to right and left rear wheels Wrr, Wrl and an ECU (Electronic Control Unit) 3 as the electronic control device for controlling the transmission torque of the electromagnetic type drive power transmission device 2. The drive power from the engine 1 is transmitted to a transfer 5 through a transaxle 4 incorporating a transmission (not shown) therein, and the drive power distributed to the front wheel side is transmitted to the right and left front wheels Wfr, Wfl through a front differential gear (not shown), while the drive power distributed to the rear wheel side is transmitted to the right and left rear wheels Wrr, Wrl through a first propeller shaft 6a, the electromagnetic type drive power transmission device 2, a second propeller shaft 6b and a rear differential gear 7.

The electromagnetic type drive power transmission device 2 contains in the casing 2a a clutch mechanism 2b for transmitting the drive power transmitted from the engine 1 to the pair of the front wheels Wfr, Wfl, to the other pair of the rear wheels Wrr, Wrl and the electromagnetic coil 2c for controlling the transmission torque of the clutch mechanism 2b. The ECU 3 is provided for controlling the electric current flow to the coil 2c and is arranged in a space for driver's legs or in an engine room. The ECU 3 and the coil 2c are connected by means of a harness 8.

In the foregoing drive power transmission control device, the electromagnetic type drive power control device 2 and the ECU 3 are separated, wherein the electromagnetic type drive power transmission device 2 is of the nature involving nonuniformity in mechanical quality, while the ECU 3 is of the nature involving nonuniformity in electrical quality. Therefore, it has been laborious to adjust these kinds of nonuniformity as a whole. Further, the electromagnetic type drive power transmission device 2 and the ECU 3 are individually arranged at respective places remote from each other, and this has given rise to another problem that a long harness 8 is required thereby resulting in an increase of the vehicle weight.

Further, a drive power transmission device of this kind usually incorporates therein an electromagnetic clutch mechanism of multiple wet plate type and brings clutch plates into friction engagement by controlling the application of electric current to an electromagnetic coil incorporated in the clutch mechanism 2b, so that the drive power of an engine can be transmitted to rear wheels through propeller shafts, a rear differential gear and a pair of right and left rear axles. The friction engagement force of the clutch plates depends on the magnitude or value of electric current applied to the electromagnetic coil, and the drive power transmitted to the rear wheels increases as the friction engagement force becomes large. That is, in a four-wheel drive vehicle called as "Stand-by Type", by controlling the friction engagement force of the clutch plates, the drive power transmission device selects either a four-wheel drive state or a two-wheel drive state and controls the distribution ratio of the drive power between the front wheels and the rear wheels in the four-wheel drive state.

As the drive power distribution to the rear wheels increases, the friction engagement force of the clutch plates becomes large, whereby friction heat generated on the clutch plates causes the temperature of lubricant oil filled in the drive power transmission device to rise. Lubricant oil has the nature to lower its viscosity with increase in its temperature and hence, to make the transmitted drive power small. To transmit a desired drive power in this situation, it is required to make the friction engagement force of the clutch plates larger. However, making the friction engagement force of the clutch plates larger causes the oil temperature to rise higher, which would leads to failure of the drive power transmission device. For this reason, as described in Japanese unexamined, published patent applications No. 2003-136989 and No. 2003-136990, there have been proposed drive power transmission devices, wherein a temperature sensor is provided for detecting the temperature of the lubricant oil and wherein, when the oil temperature exceeds a predetermined value, the distribution rate of the drive power is lowered so that the friction engagement force of the clutch plates is weakened thereby to lower the oil temperature.

However, in these known devices, an ECU is mounted usually on a place which is not liable to be influenced by water and dust and therefore, is located remote from the drive power transmission device. Therefore, the temperature sensor has to be attached inside a housing of the drive power transmission device, and leads (i.e., cable or harness) extending from output terminals of the temperature sensor have to be taken out from the housing. Further, sealing means has to be interposed between the leads and the housing to prevent water and dust from entering the inside of the housing. Consequently, the prior art drive power transmission devices give rise to problems that they requires laborious work in attaching the temperature sensor and incur a substantial increase in the manufacturing cost.

To obviate these drawbacks, one may conceive of a construction which arranges the aforementioned temperature sensor not inside the drive power transmission device but at a portion which is somewhat distant from the drive power transmission device, to detect the temperature of the same and which utilizes the detected temperature and the electric current applied to the electromagnetic coil in calculating the temperature of the lubricant oil. However, where the construction is taken, additional measures for, e.g., attaching a case with a sealing structure to the vehicle body and for attaching the temperature sensor inside the case, have to be taken to protect the temperature sensor from water or dust. This also makes it laborious to attach the temperature sensor.

Further, where a heat resistance element of the character which makes its resistance vary in dependence on temperature is used as the temperature sensor, it is possible that a precise resistance value (i.e., temperature) cannot be detected under the influence of resistance components included in the leads themselves. It is also possible that a precise temperature cannot be detected under the influence of noise which would be generated in dependence on the length or wiring arrangement.

Where the temperature sensor is connected to the ECU by means of leads, it has been a practice to use connectors, for which water-proof capability is essential. In the case of the connection using connectors, it is possible that a precise resistance value cannot be detected under the influence of friction resistances at connector pins. In addition, incomplete joining of the connectors would make it impossible to detect a precise resistance value or the temperature.

SUMMARY OF THE INVENTION

Accordingly, it is a primary object of the present invention to provide an improved drive power transmission control device capable of adjusting as a whole nonuniformity in mechanical quality of an electromagnetic type drive power transmission device and nonuniformity in electrical quality of an electronic control device and also capable of lightening the vehicle weight.

Another object of the present invention is to provide effective measures to prevent an electronic control device from being heated by heat conduction thereto and by heat generation inside.

It is also another primary object of the present invention to provide an improved drive power transmission control device capable of easing difficulties arising in attaching temperature detection means like a temperature sensor, of reducing the cost therefor, and of precisely detecting the temperature of a drive power transmission device.

Briefly, in a first aspect of the present invention, there is provided a drive power transmission control device comprising an electromagnetic type drive power transmission device and an electronic control device therefor. The electromagnetic type drive power transmission device contains in a casing a clutch mechanism for transmitting drive power transmitted from a drive power source of a vehicle to either of front and rear wheels to the remaining wheels and also contains an electromagnetic coil for controlling the torque transmitted by the clutch mechanism. The electronic control device controls electric current applied to the electromagnetic coil of the electromagnetic type drive power transmission device. Further, the electronic control device is provided bodily on the casing of the electromagnetic type drive power transmission device.

In the drive power transmission control device wherein the electronic control device is provided bodily on the electromagnetic type drive power transmission device as construed above, it becomes possible to adjust as a whole nonuniformity or deflection in mechanical quality of the electromagnetic type drive power transmission device and nonuniformity or deflection in electrical quality of the electronic control device, so that the performance in controlling the drive power transmission can be improved. Further, since the electronic control device which used to be arranged remote from the electromagnetic type drive power transmission device in the prior art is united with the electromagnetic type drive power transmission device, a harness for connecting the both components can be shortened, by which extent the weight of the vehicle can be lightened.

In a second aspect of the present invention, there is provided a drive power transmission control device for a vehicle having an electronic control device for controlling drive power transmitted by a drive power transmission device from a power source to plural wheels. The electronic control device comprises a chassis made of a resin and provided independently of the drive power transmission device; and a temperature sensor attached inside the chassis for detecting the temperature of the drive power transmission device. At least one bracket made of a resin is further provided bodily with the chassis for mounting the chassis on the drive power transmission device; and a heat conduction portion is further provided at least partly bodily with the at least one bracket for conducting the heat generated by the drive power transmission device to the temperature sensor.

With this construction, since the temperature sensor is incorporated in the electronic control device instead of being assembled into the drive power transmission device, it becomes unnecessary to take out a cable or harness, extending from output terminals of the temperature sensor, from the housing of the drive power transmission device. Thus, it becomes unnecessary to machine any hole on the housing for attaching the temperature sensor, and it also becomes unnecessary to use a sealing member between the leads and the housing so as to prevent foreign matter such as, e.g., water, dust or the like from entering the inside of the housing. Accordingly, the housing of the drive power transmission device is simplified in construction, so that the manufacturing cost therefor can be reduced. In addition, any cable or harness for connecting the temperature sensor with the electronic control device becomes unnecessary, and the cost for the harness and the cost for assembling the same can also be reduced.

BRIEF DESCRIPTION OF THE ACCOMPANYING DRAWINGS

The forgoing and other objects and many of the attendant advantages of the present invention may readily be appreciated as the same becomes better understood by reference to preferred embodiments of the present invention when considered in connection with the accompanying drawings, wherein like reference numerals designate the same or corresponding parts throughout several views, and in which:

FIG. 1 is a schematic view of a four-wheel drive vehicle to which a drive power transmission control device in a first embodiment according to the present invention is applied;

FIGS. 2(a) and 2(b) are respectively a plan view and a side view of the drive power transmission control device shown in FIG. 1;

Figure 6A:
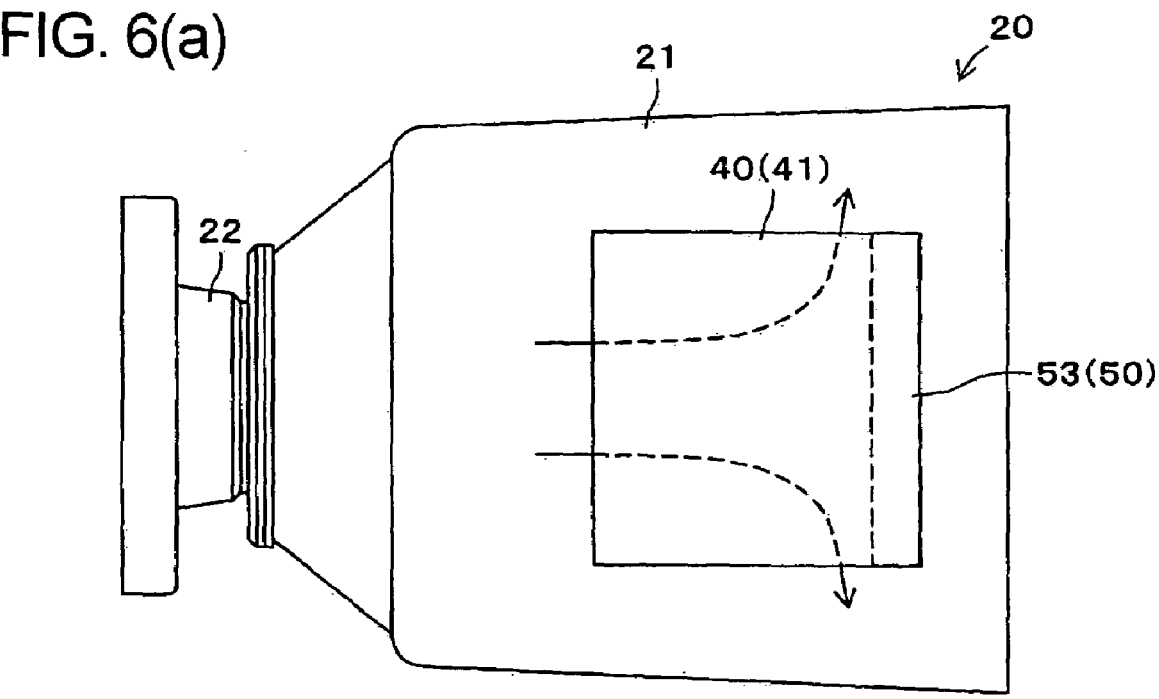
Figure 6B:
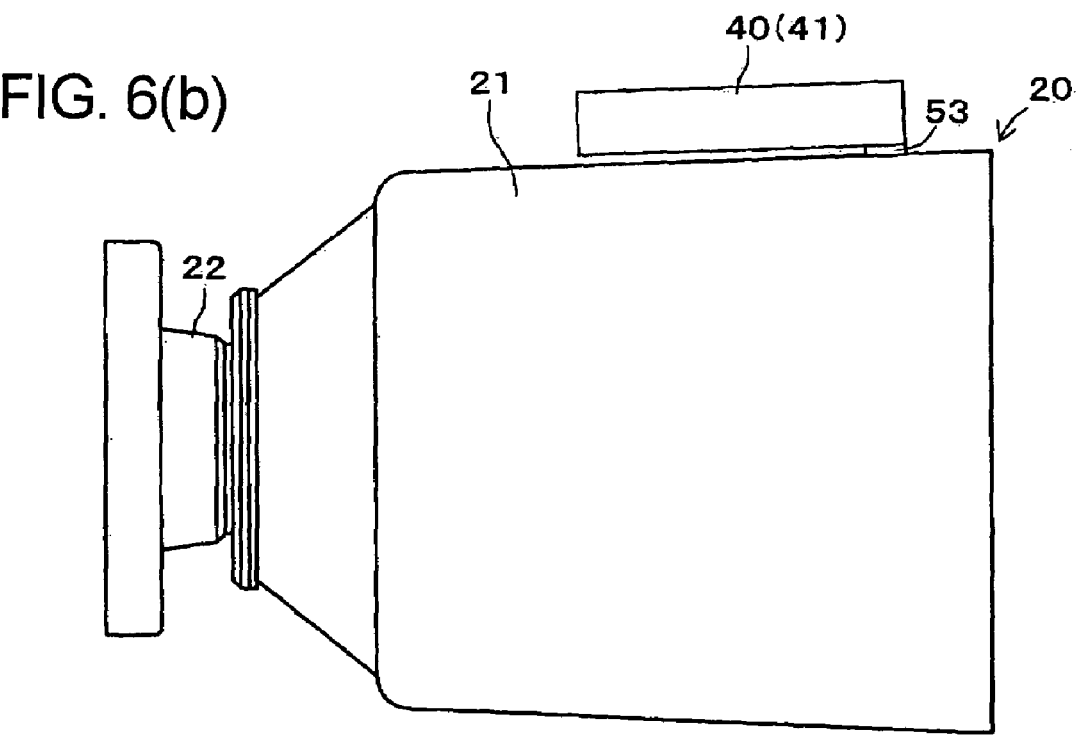
Figure 7A:
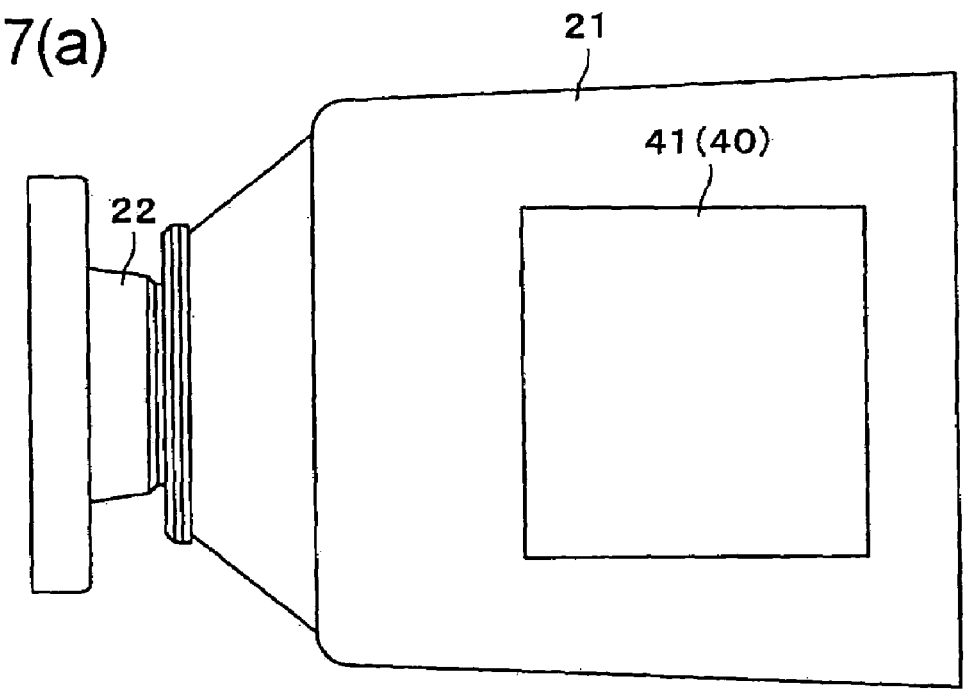
Figure 7B:
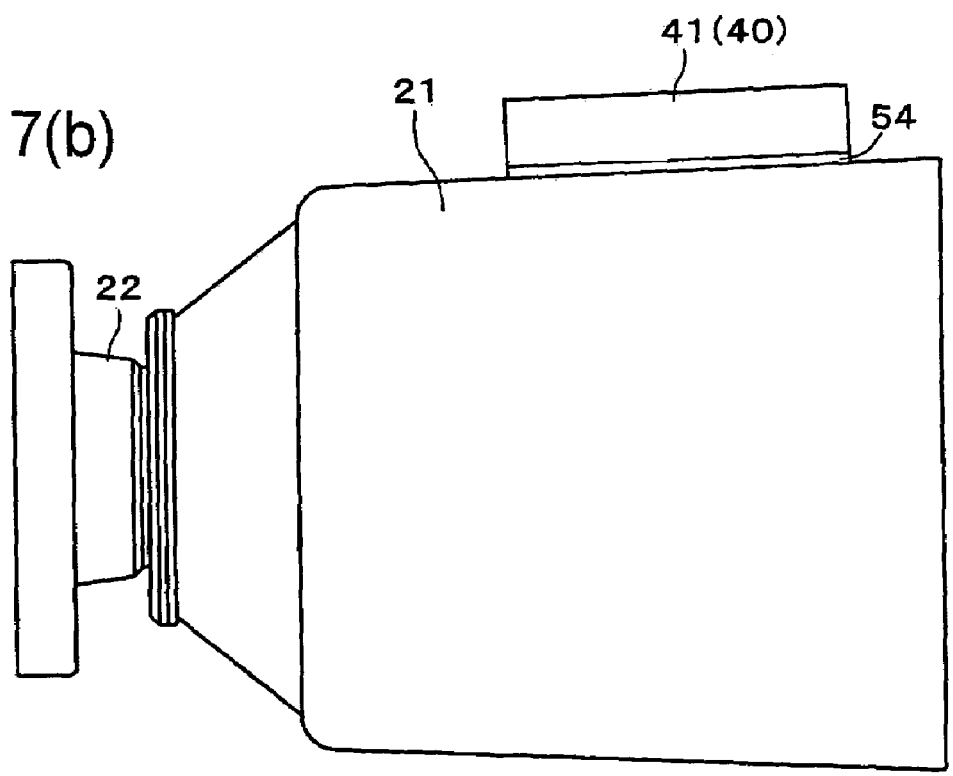
Figure 8A:
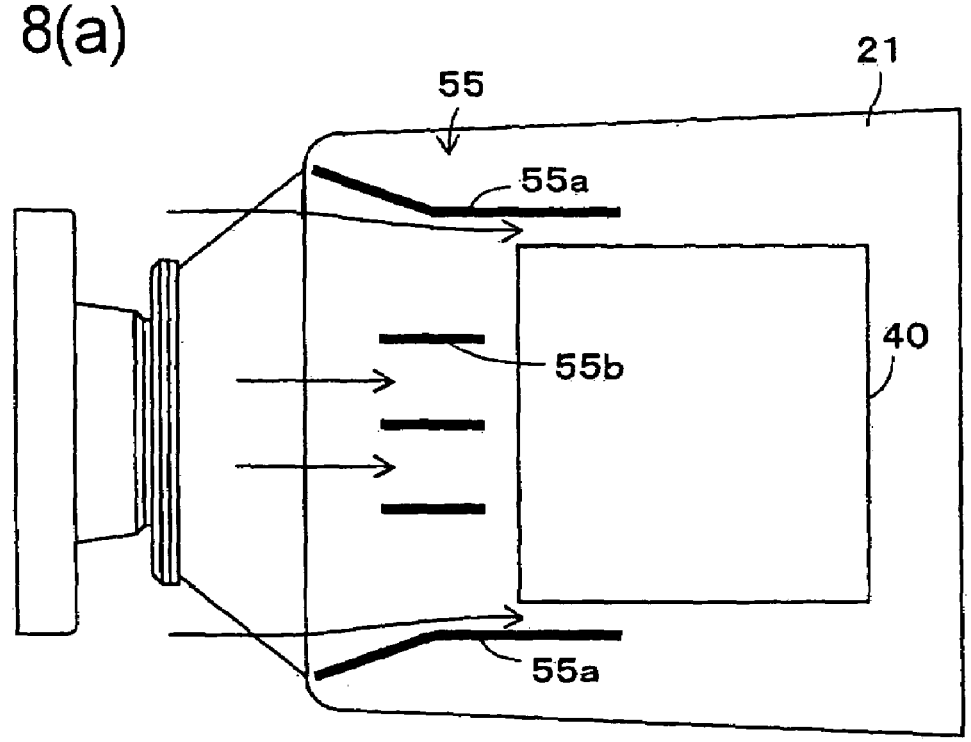
Figure 8B:
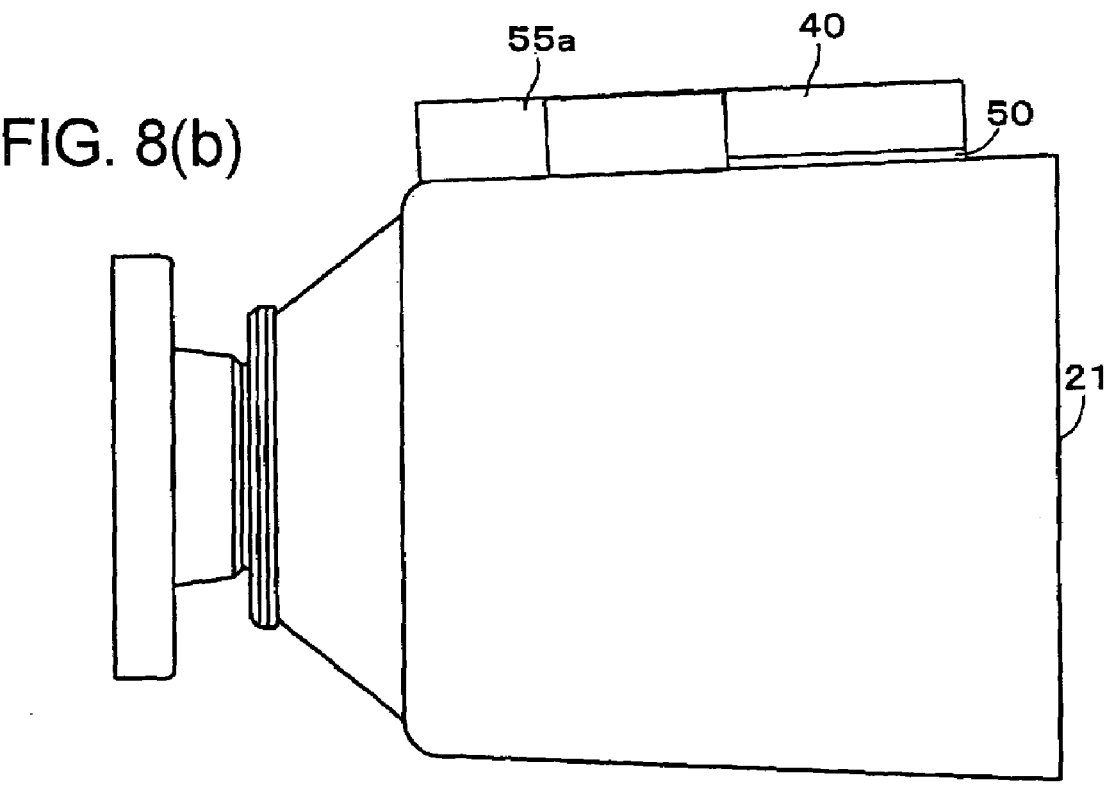
Figure 9:
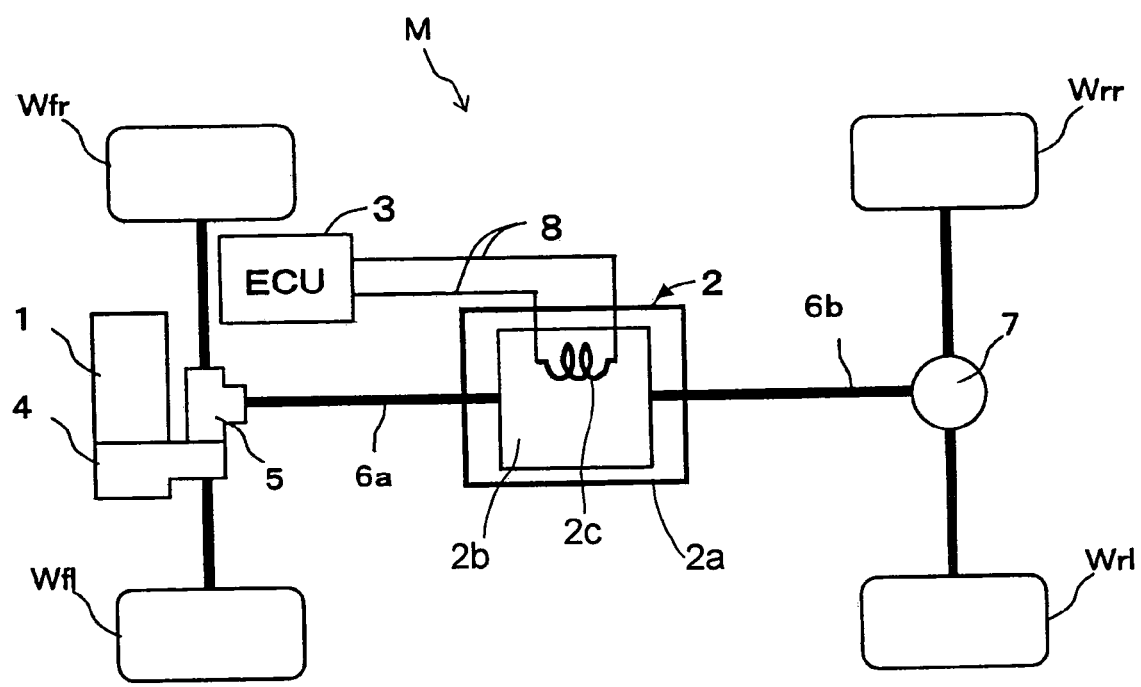
Figure 10:
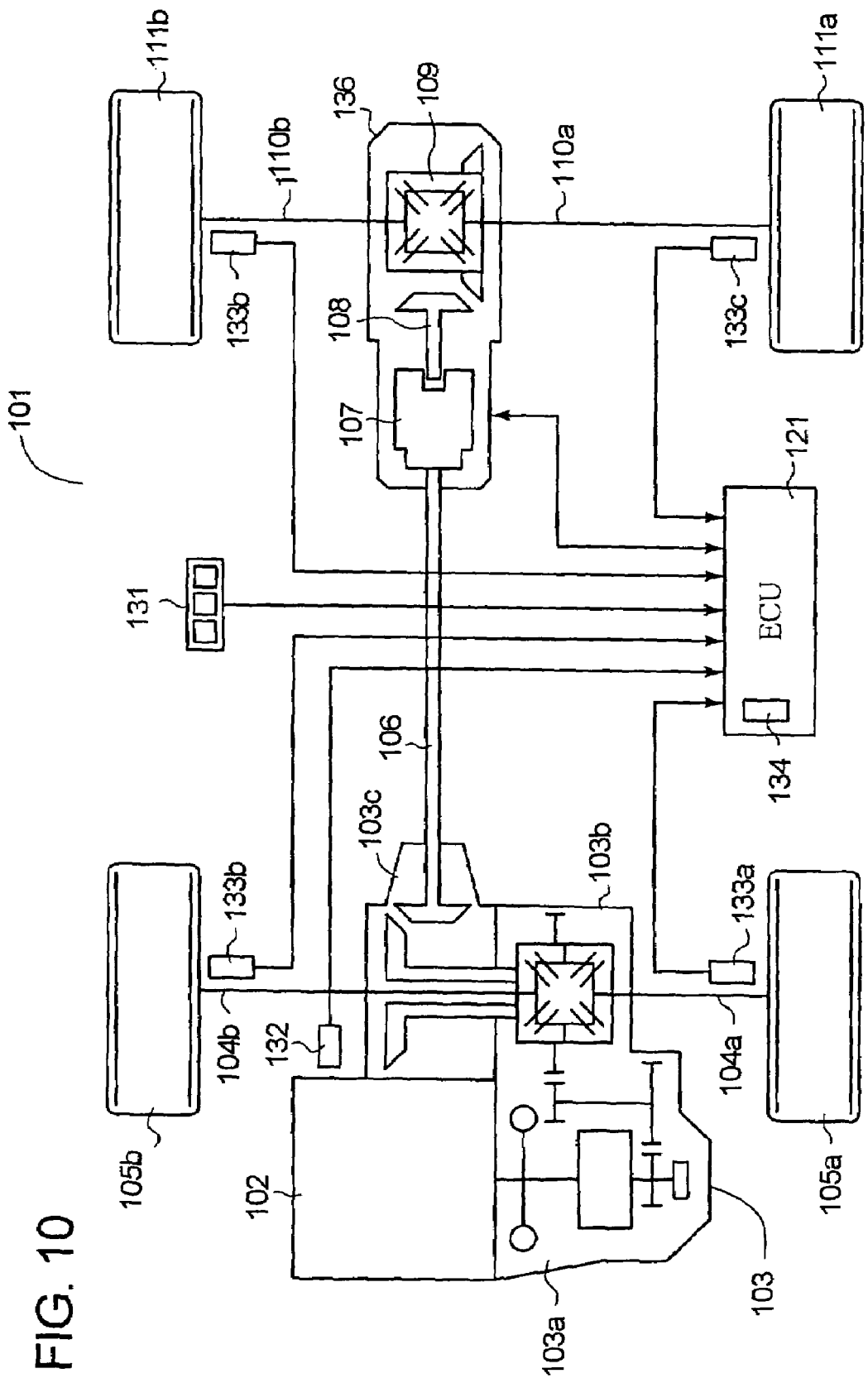
Figure 11:
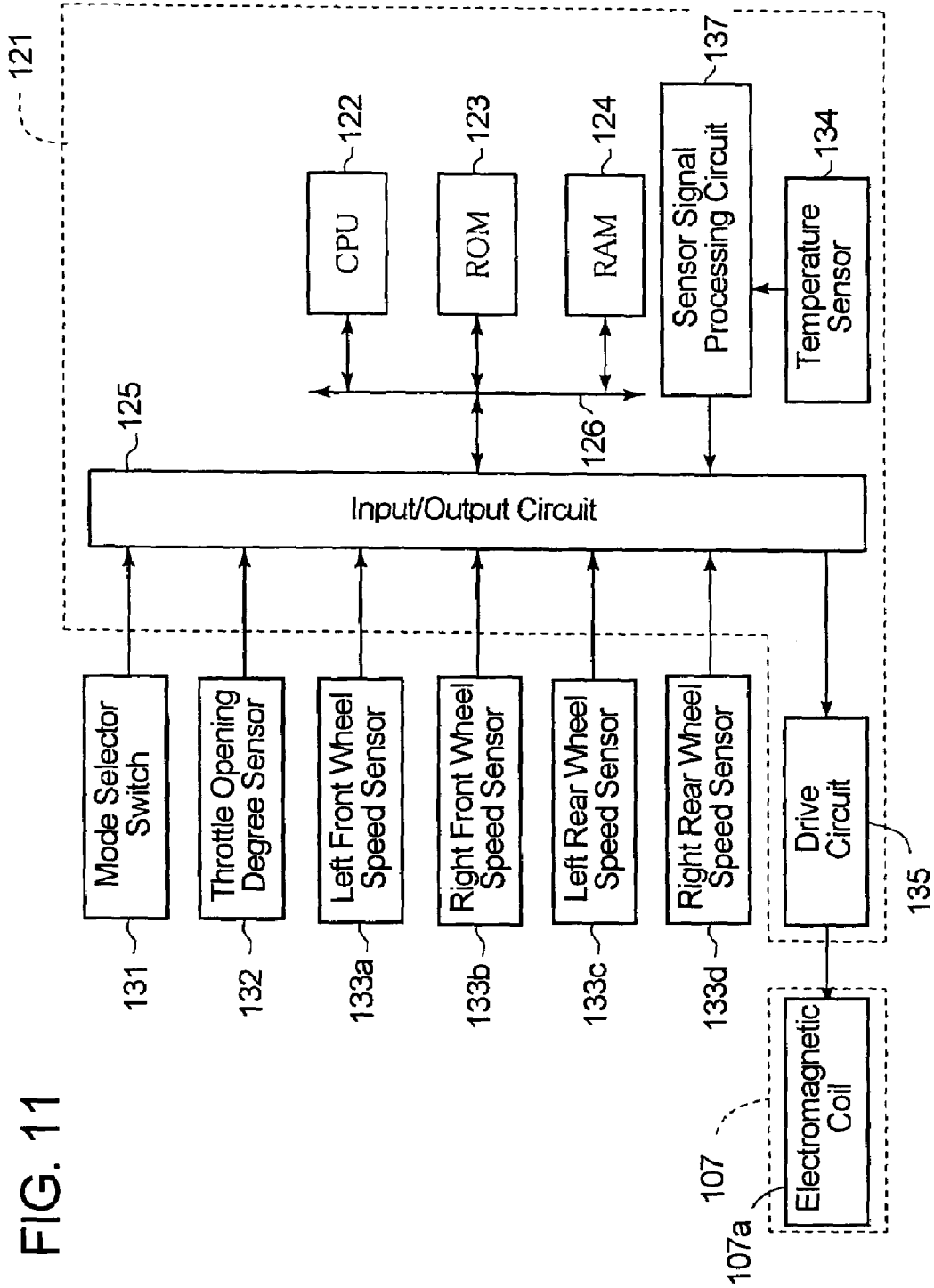
Figure 12A:
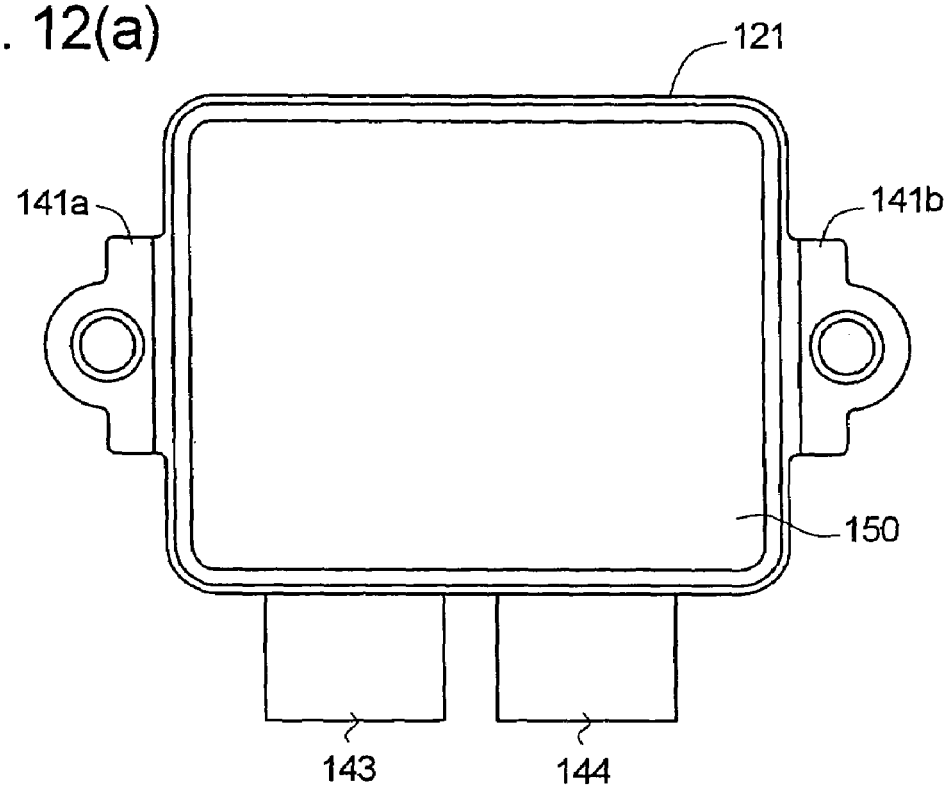
Figure 12B:
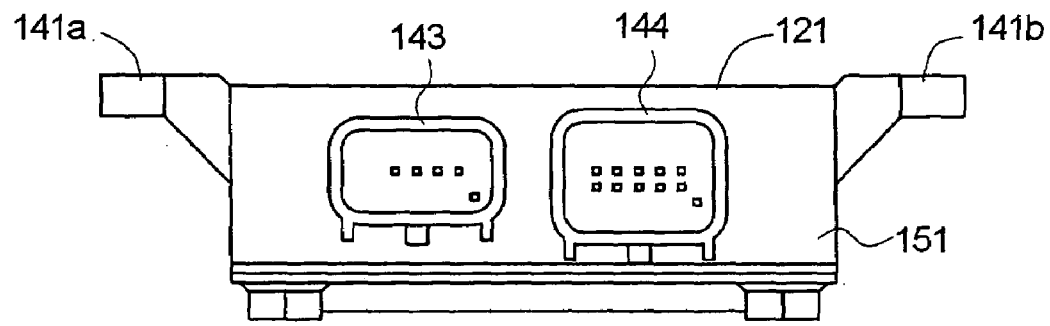
Figure 13:
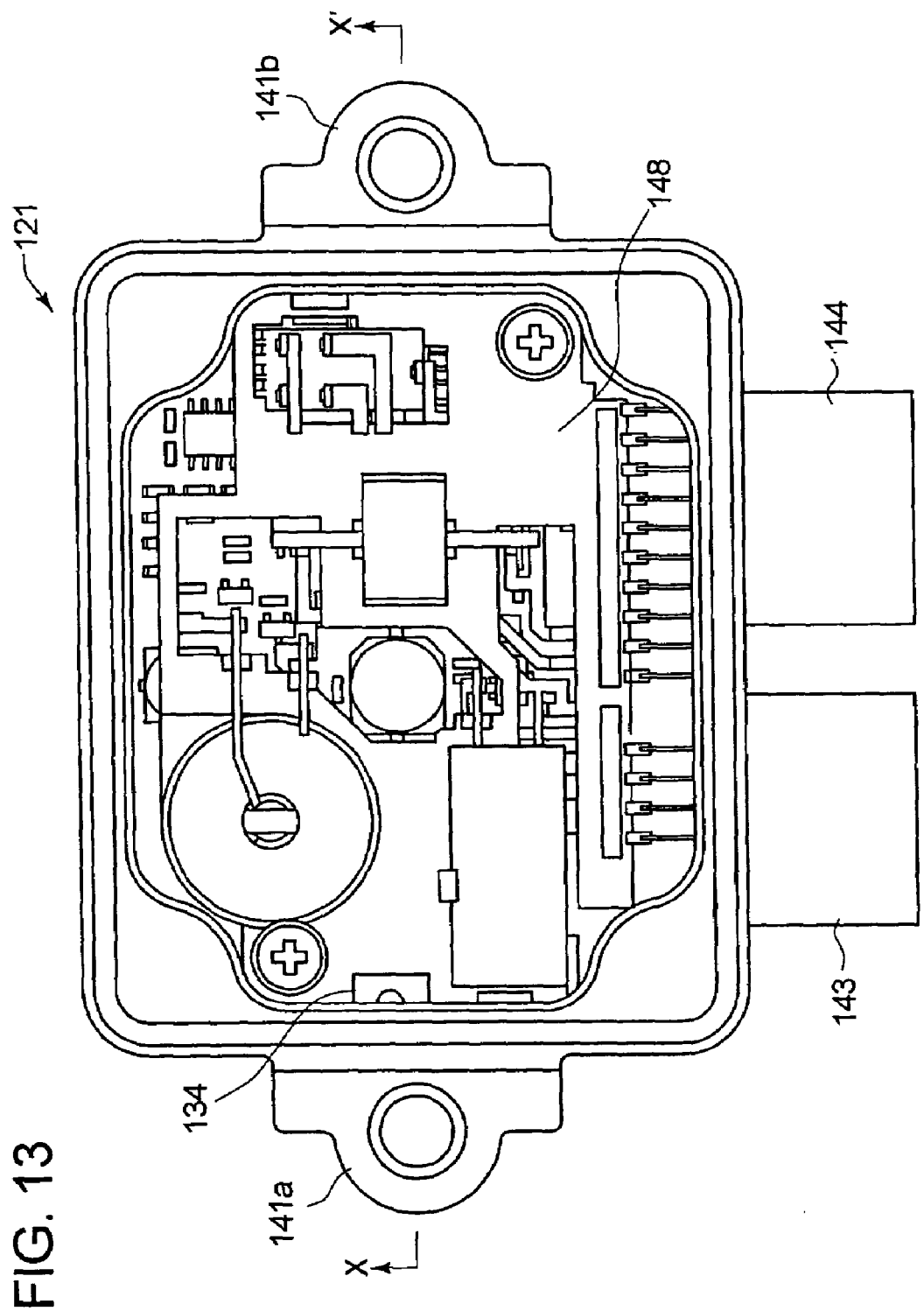
Figure 14:
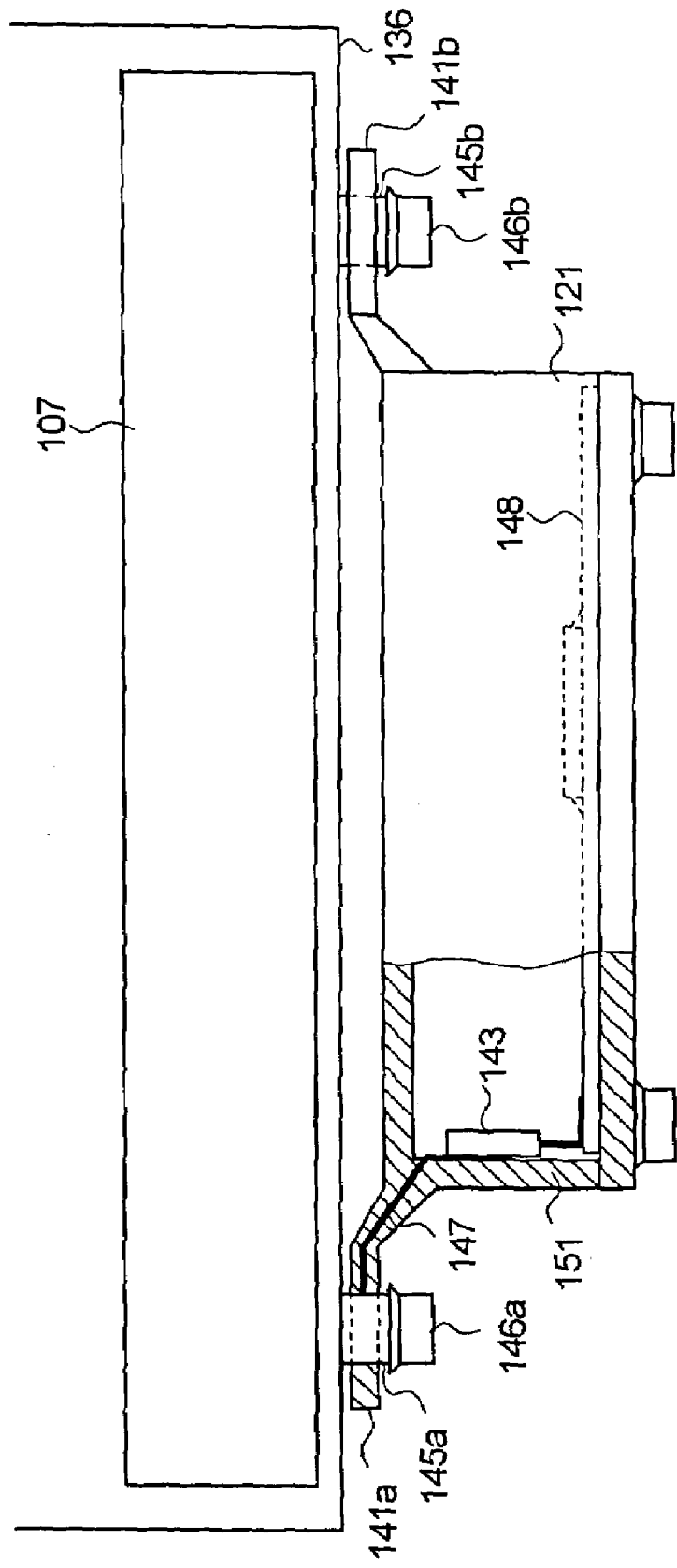

FIGS. 6(a) and 6(b) are respectively a plan view and a side view of a modification of the drive power transmission control device according to the present invention;

FIGS. 7(a) and 7(b) are respectively a plan view and a side view of another modification of the drive power transmission control device according to the present invention;

FIGS. 8(a) and 8(b) are respectively a plan view and a side view of a further modification of the drive power transmission control device according to the present invention;

FIG. 9 is a schematic view of a four-wheel drive vehicle to which a drive power transmission control device in prior art is applied;

FIG. 10 is a schematic view of a four-wheel drive vehicle to which a drive power transmission control device in a second embodiment according to the present invention is applied;

FIG. 11 is a block diagram showing a drive power transmission control circuit incorporated in an ECU;

FIGS. 12(a) and 12(b) are respectively a plan view and a side view of the ECU;

FIG. 13 is a view showing the interior of the ECU;

FIG. 14 is an explanatory view for showing the way of attaching the ECU; and

Figure 15A:
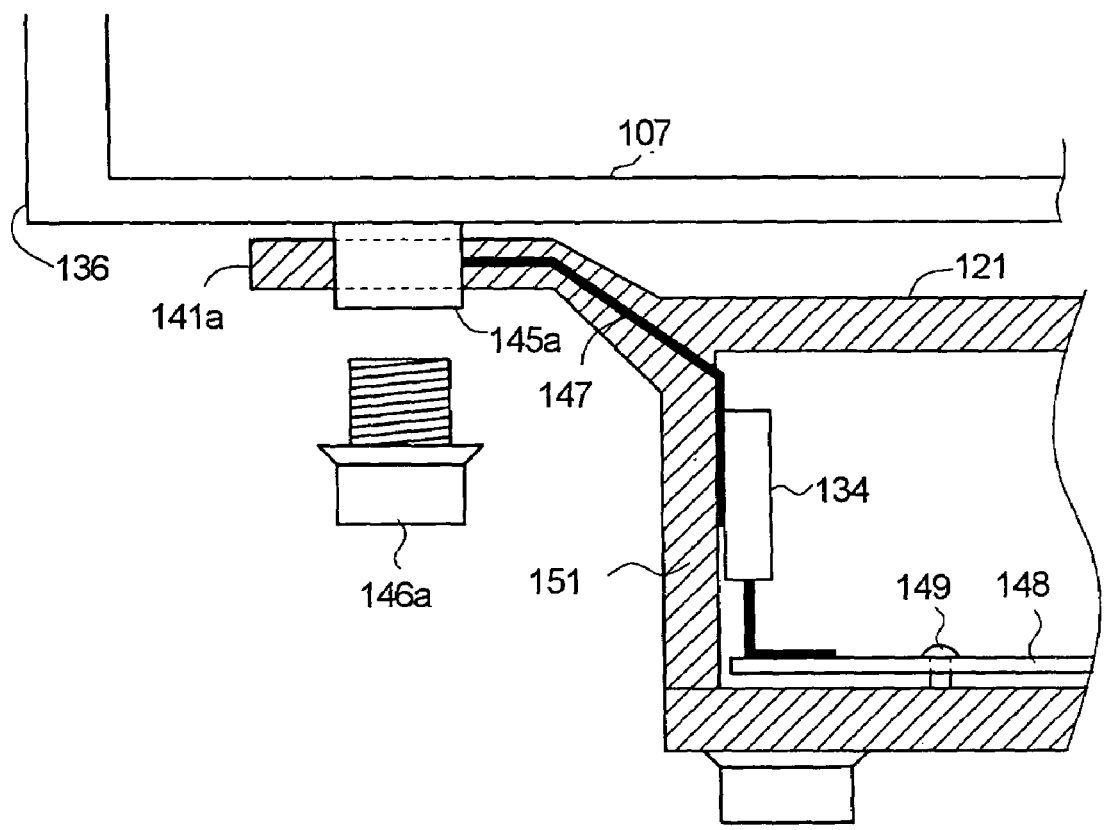
Figure 15B:
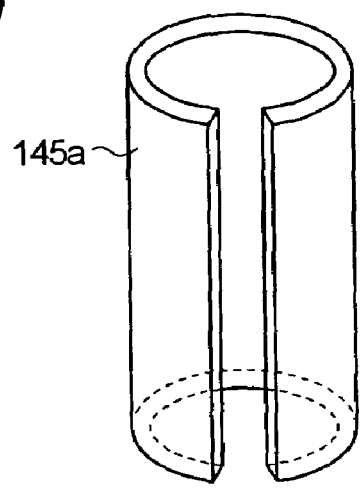

FIGS. 15(a) and 15(b) are explanatory views for showing the way of conducting heat to a temperature sensor in detail.

DETAILED DESCRIPTION OF THE PREFERRED EMBODIMENTS (First Embodiment)

Figure 1:
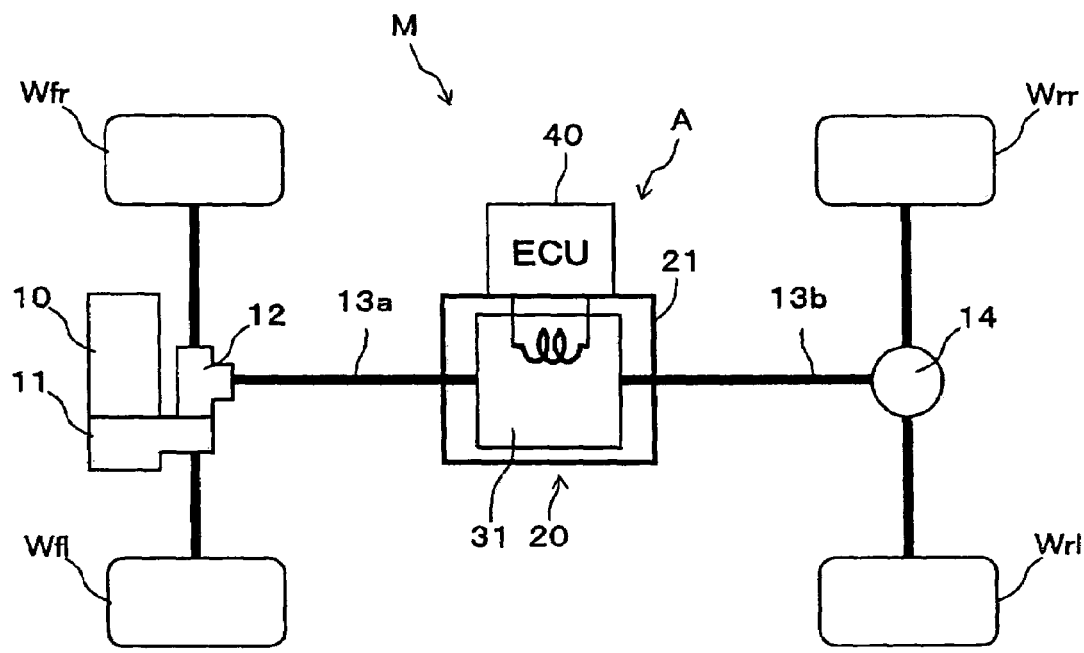

A four-wheel drive vehicle to which a drive power transmission control device in a first embodiment according to the present invention is applied will be described with reference to the accompanying drawings. FIG. 1 is a schematic view showing the entire construction of the four-wheel drive vehicle and the drive power transmission control device.

As shown in FIG. 1, the four-wheel drive vehicle M is provided with the drive power transmission control device A, which is provided with an electromagnetic type drive power transmission device 20 capable of varying the transmission torque which connects right and left front wheels Wfr, Wfl driven by an engine 10 to right and left rear wheels Wrr, Wrl, and is further provided with an ECU (Electronic Control Unit) 40 as a control device for controlling the transmission torque of the transmission device 20. The drive power from the engine 10 is transmitted to a transfer 12 through a transaxle 11 incorporating a transmission (not shown) therein, and the drive power distributed to the front wheel side is transmitted to the right and left front wheels Wfr, Wfl through a front differential gear (not shown), while the drive power distributed to the rear wheel side is transmitted to right and left rear wheels Wrr, Wrl through a first propeller shaft 13a, the electromagnetic type drive power transmission device 20, a second propeller shaft 13b and a rear differential gear 14.

The electromagnetic type drive power transmission device 20 is provided with a casing 21 assembled to a vehicle body (not shown). In the casing 21, as mainly shown in FIG. 2(b), there is provided an outer case 31, which is arranged rotatably and coaxially of the casing 21 and which is connected to the first propeller shaft 13a as an input shaft. The outer case 31 is composed of a housing 31a of a bottomed, cylindrical shape and a rear cover 31b closing a rear end opening portion of the housing 31a. A support member 22 to which the first propeller shaft 13a is connected is secured to one end of the housing 31a, and the support member 22 is rotatably supported in the casing 21 through a bearing member 23.

Figure 3:
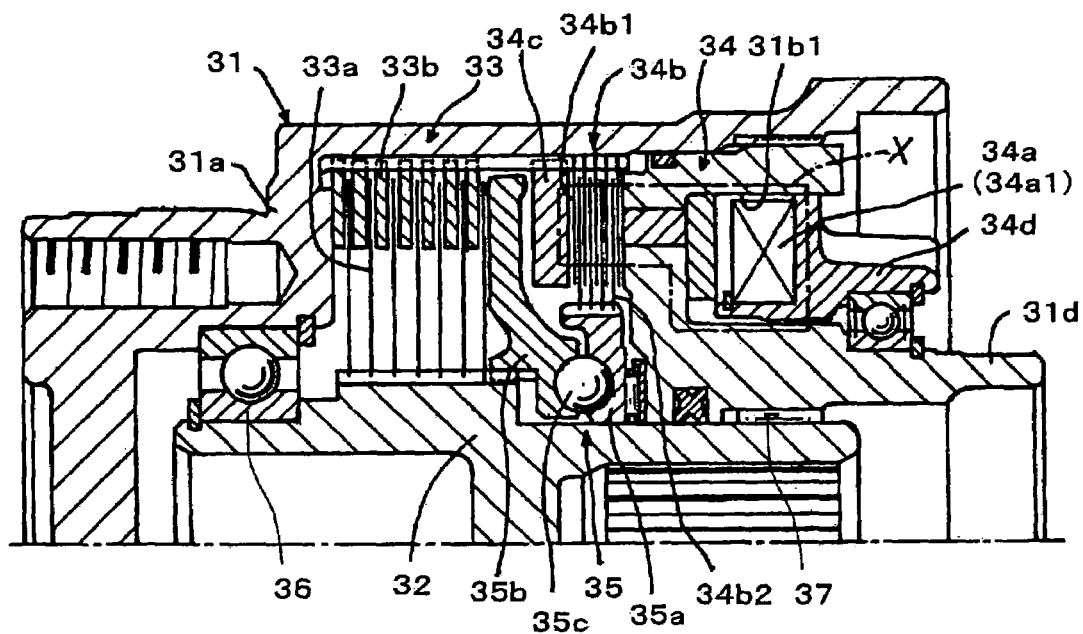
FIG. 3 is a longitudinal sectional view showing the interior construction of a drive power transmission device.

As shown in FIG. 3, the outer case 31 is provided therein with an inner shaft 32, which is arranged coaxially with the outer case 31 to be supported rotatably and which is connected to the second propeller shaft 13b as an output shaft. The inner shaft 32 is rotatably carried by the housing 31a and the rear cover 31 through bearing members 36, 37.

Provided between the outer case 31 and the inner shaft 32 are a main clutch mechanism 33 and a pilot clutch mechanism 34, between which a cam mechanism 35 is provided for transmitting the action force generated by the pilot clutch mechanism 34 to the main clutch mechanism 33 thereby to operate the main clutch mechanism 33.

The main clutch mechanism 33 is a friction clutch of the multiple wet plate type and is constituted in such a way that plural inner clutch plates 33a assembled on the outer circumference of the inner shaft 32 and plural outer clutch plates 33b assembled on the inner circumference of the housing 31a are arranged in an alternate fashion to be frictionally engageable with one another.

The pilot clutch mechanism 34 is composed of an electromagnet 34a, a friction clutch 34b, an armature 34c, and a yoke 34d. The electromagnet 34a is constituted by an electromagnetic coil 34a1 (refer to FIG. 5) and takes an annular shape. The electromagnet 34a is securely held by the yoke 34d which is supported around a rear end portion of the rear cover 31b to be rotatable relative to the same and which is secured to the vehicle body side. The electromagnet 34a is received in an annular space 31b1 of the rear cover 31b. The friction clutch 34b is of the multiple wet plate type and is constituted in such a way that plural outer clutch plates 34b1 assembled on the inner circumference of the housing 31a and plural inner clutch plates 34b assembled on the outer circumference of a first cam member 35a constituting a cam mechanism 35 referred to later are arranged in an alternate fashion to be frictionally engageable with each other. The armature 34c takes an annular shape and is assembled onto the inner circumference of the housing 31a to be movable axially.

The cam mechanism 35 is composed of the first cam member 35a, a second cam member 35b and cam followers 35c. The first cam member 35a is rotatably fit on the outer circumference of the inner shaft 32 and is rotatably supported by the rear cover 31b at its rear end surface. The outer circumference of the first cam member 35a is spline-engaged with the inner circumference of the inner clutch plates 34b2 of the friction clutch 34b. The second cam member 35b is assembled through spline-engagement with the outer circumference of the inner shaft 32 to be rotatable bodily with the inner shaft 32 and is positioned to face the rear side of an inner clutch plate 33a of the main clutch mechanism 33. The ball-like cam followers 35c are received in cam grooves which mutually face between the first cam member 35a and the second cam member 35b.

The foregoing main clutch mechanism 33, the pilot clutch mechanism 34 and the cam mechanism 35 constitute a clutch mechanism for transmitting to the right and left rear wheels Wrr, Wrl the drive power transmitted from the engine 10 to the right and left front wheels Wfr, Wfl.

The operation of the electromagnetic type drive power transmission device 20 as constructed above will be described hereinafter. While the electromagnetic coil 34a1 constituting the electromagnet 34a of the pilot clutch mechanism 34 is not given electric current, a magnetic path X (a loop circulating magnetic path along which a magnetic flux starts from the electromagnet 34a and circulates to pass through the yoke 34*d*, the rear cover 31*b*, the friction clutch 34*b* and the armature 34*c*) is not made, and the friction clutch 34*b* remains in a disconnection state. Thus, the pilot clutch 34 is kept in a disconnection state, the first cam member 35*a* constituting the cam mechanism 35 is rotated bodily with the second cam member 35 by the agency of the cam followers 35*c*, and the main clutch mechanism 33 remains in the disconnection state. Accordingly, the vehicle M is operated in a first drive mode of the two-wheel drive.

When electric current is applied to the coil 34*a*1, on the contrary, the magnetic path X is made in the pilot clutch mechanism 34 to generate a magnetic force, whereby the electromagnet 34*a* attracts the armature 34*c*. This causes the armature 34*c* to pressure the friction clutch 34*b* thereby to bring the same into friction engagement. The first cam member 35*a* of the cam mechanism 35 is brought into connection with the outer case 31 side thereby to bring about the relative rotation between itself and the second cam member 35*b*. As a result, the cam mechanism 35 operates to make the cam followers 35*c* pressure both of the cam members 35*a*, 35*b* to separated from each other.

Thus, the second cam member 35*b* is pressured on the main clutch mechanism 33 thereby to pressure the same by itself and a bottom wall portion of the housing 31*a*, whereby the main clutch mechanism 33 is brought into friction engagement in proportion to the friction engagement force made by the friction clutch 34*b*. Therefore, torque transmission takes place between the outer case 31 and the inner shaft 32, and the vehicle M is operated in a second drive mode of the four-wheel drive wherein the first propeller shaft 13*a* and the second propeller shaft 13*b* are kept between a disconnection state and a direct connection state. In this drive mode, the distribution ratio of drive power to the front wheels Wfr, Wfl and to the rear wheels Wrr, Wrl can be controlled within a range from 100:0 (two-wheel drive state) to 50:50 (direct connection state). During the connection state, slips take place between the clutch plates of the pilot clutch mechanism 34 and the main clutch mechanism 33, and such slips bring about heat generation caused by friction.

In the second drive mode, the traveling state of the vehicle M and the road surface state are detected based on signals from various sensors S such as, for example, wheel speed sensors, a throttle opening-degree sensor, a steering angle sensor or the like, and the electric current applied to the coil 34*a*1 is put under duty control based on the detected vehicle traveling state and the road surface state, whereby the friction engagement force of the friction clutch 34*b*, that is, the transmission toque to the rear wheels Wrr, Wrl can be controlled.

When the electric current applied to the coil 34*a*1 is increased to a predetermined value, the attraction force exerted on the armature 34*c* is increased. The armature 34*c* is attracted strongly thereby to strengthen the friction engagement force of the friction clutch 34*b*, which causes the relative rotation between both of the cam members 35*a*, 35*b* to increase. As a consequence, the cam followers 35*c* strengthen the pressuring force on the second cam member 35*b* thereby to place the main clutch mechanism 33 in the connection state. Therefore, the vehicle M is operated in a third drive mode of four-wheel drive wherein the first propeller shaft 13*a* and the second propeller shaft 13*b* are kept in the direct connection state.

Figure 5:
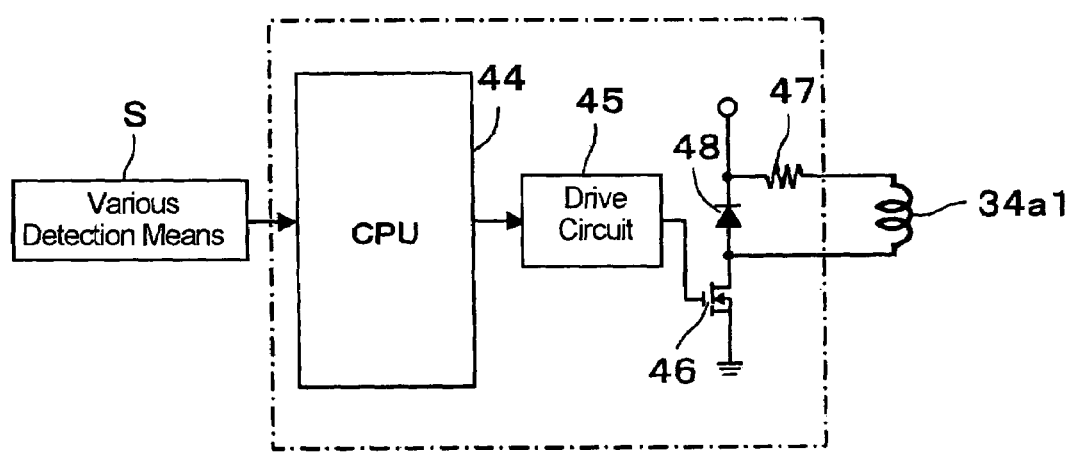
FIG. 5 is an electrical block diagram of a control board shown in FIG. 4.
Figure 4:
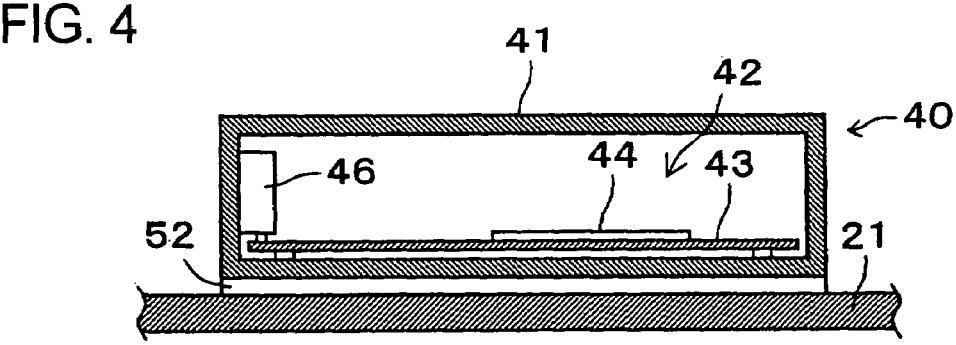
FIG. 4 is a sectional view showing the interior construction of an ECU shown in FIG. 2(b)

As shown in FIG. 4, the ECU 40 is composed of a case or chassis 41 made of a metal and a control board 42 contained in the chassis 41. The control board 42 is constituted by mounting various electronic components, a CPU 44 and a switching element 46. The switching element 46 is constituted by, e.g., a MOSFET (MOS type Field Effect Transistor) which becomes heated by repetitive switching operations, and thus, is secured closely tightly to the chassis 41 for heat radiation. As shown in FIG. 5, the control board 42 has mounted thereon the CPU 44, a drive circuit 45 and the switching element 46. The switching element 46 is connected at its drain terminal to a battery as a direct current power supply through the aforementioned coil 341*a* and a resistance 47, is connected at its gate terminal to the drive circuit 45, and is grounded at its source terminal. A diode 48 is connected in parallel with the coil 34*a*1. The CPU 44 takes thereinto detection signals from various detection means or sensors S and calculates control values based on the detection signals. Further, the CPU 44 executes processing for PWM (Pulse Width Modulation) based on these control values and outputs the processing results to the drive circuit 45 thereby to control the application of electric current to the coil 34*a*1 through the drive circuit 45.

Figure 2A:
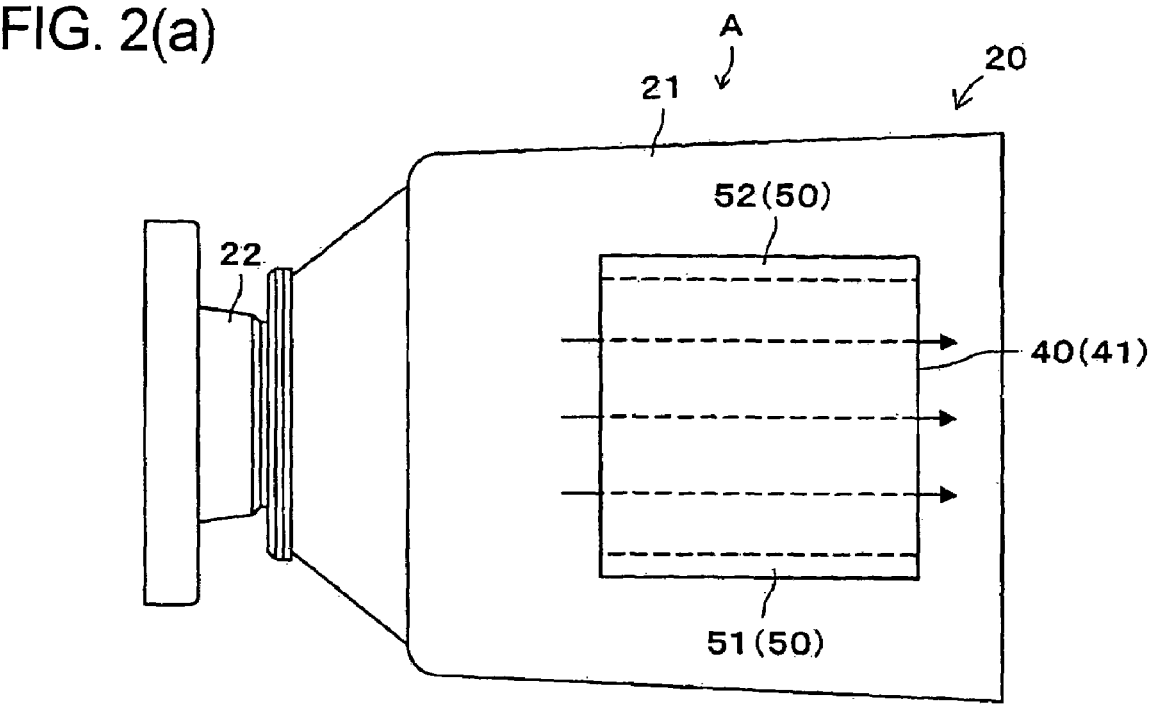
Figure 2B:
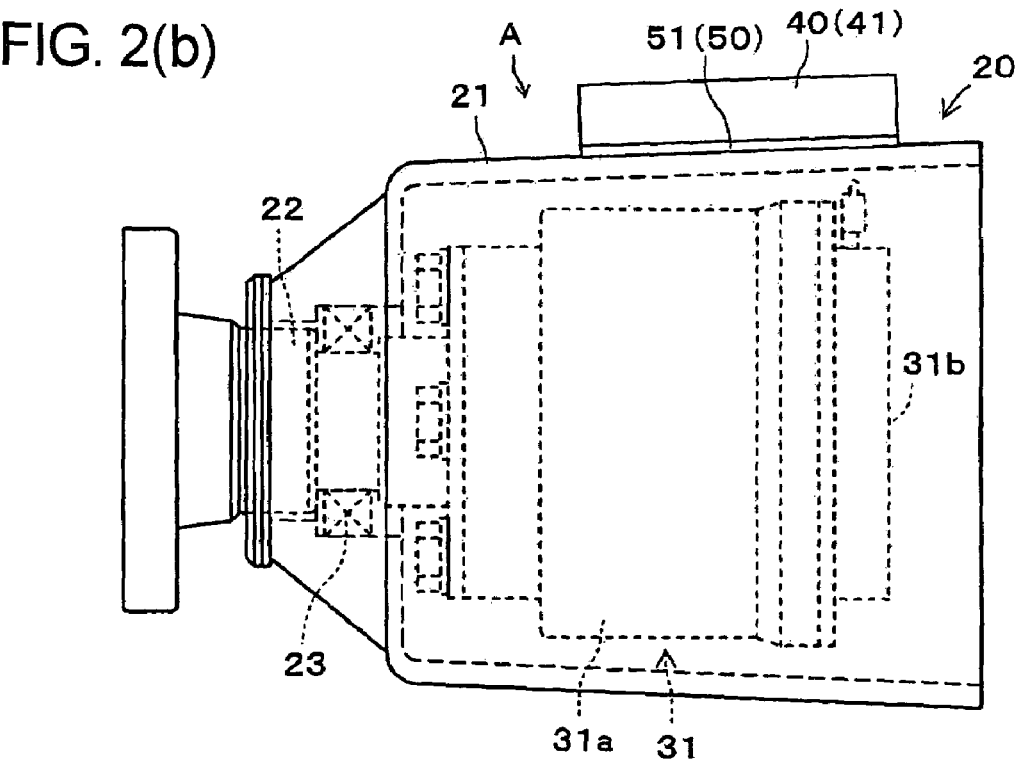

As shown in FIGS. 2(*a*) and 2(*b*), the aforementioned ECU 40 is supported on, and secured to, the external surface of the casing 21 of the electromagnetic type drive power transmission device 20 through support means 50, with a clearance or space made from the casing 21. The ECU 40 may be fixed or secured by screwing, adhesion or welding. The support means 50 is composed of a pair of right and left support members 51, 52 secured to right and left edge portions on a bottom surface of the ECU 40, and these support members 51, 52 are arranged with a space provided therebetween. That is, the support members 51, 52 do not support the entire bottom surface of the chassis 41, but supports one or several portions of the entire bottom surface. Thus, the contact or connection area between the casing 21 of the electromagnetic type drive power transmission device 20 and the chassis 41 of the ECU 40 can be restrained to be as small as possible, and a space as large as possible can be made between the casing 21 and the ECU 40. Therefore, during the vehicle traveling, the air flows as indicated by the arrows, so that the ECU 40 can be cooled also from the bottom surface thereof.

The right and left support members 51, 52 are made of a rigid material (e.g., a metal). Preferably, the right and left support members 51, 52 are made of a material which has a large capability in heat insulation in addition to being highly rigid. Thus, it is possible to prevent the heat generated in the electromagnetic type drive power transmission device 20 from being conducted to the ECU 40. Also preferably, one or several flat surface portions are provided on the casing 21 to mount the right and left support members 51, 52. The casing 21 in this particular embodiment has a cylindrical external surface, in which case one or two ledge portions are protruded on the external surface of the casing 21 to provide the flat surface portions. If the casing 21 takes a square outer shape in cross-section, the support members 51, 52 supporting the ECU 40 are attached directly to a top surface of the casing 21 or to one or two flat surfaces which are formed by machining on the top surface of the casing 21.

Preferably, as shown in FIG. 4, the ECU 40 is arranged and secured to the casing 21 with the switching element 46 as a heat generation element being located upstream of the air flow within the ECU 40, in other words, with the switching element 46 being located at the forward side of the vehicle M within the ECU 40. Thus, during the vehicle traveling, the air which flows to come from the forward side of the vehicle M directly hits the large heat generating portion of the ECU40, so that the ECU 40 can be cooled effectively.

In the first embodiment, as is clear from the foregoing description, the drive power transmission control device A takes the construction that the ECU 40 is provided bodily on the electromagnetic type drive power transmission device 20. Consequently, adjustments can be made as a whole as to the nonuniformity in mechanical quality of the electromagnetic type drive power transmission device 20 and as to the nonuniformity in electrical quality of the ECU 40, and the performance of the drive power transmission control device A can be easily adjusted to a predetermined target level. More specifically, where the non-uniformity in mechanical quality causes the foregoing magnetic path X to be varied in magnetic resistance, there occurs a change in the drive power distribution ration between the front and rear wheels relative to the electric current applied to the coil 34a1. To avoid this, it is conceivable to measure the relation between "electric current" and "drive power distribution ratio" in advance for each of the products after assembling for storage in the ECU 40 and to utilize the measured relation in compensating the electric current applied to the coil 34a1 therefor or adjusting a variable resistance which may be arranged in series to the coil 34a1. However, this work becomes laborious where the electromagnetic type drive power transmission device 20 and the ECU 40 are separated from each other beyond, e.g., the arm's length distance. In this particular embodiment, on the contrary, since the ECU 40 is provided bodily on the casing 21 of the electromagnetic type drive power transmission device 20, the adjusting work can be done easily and reliably. Further, since the electromagnetic type drive power transmission device 20 and the ECU 40 are always bodily transported and stored as if they are one unit, it does not occur that an ECU 40 having been adjusted is assembled by mistake to another electromagnetic type drive power transmission device 20 which have not been adjusted as a whole in the combination therewith. Furthermore, since the ECU 40 which used to be arranged in a place remote from the electromagnetic type drive power transmission device 20 in the prior art is united bodily on the electromagnetic type drive power transmission device 20, the harness which had to be long to connect the both components can be shortened, by which extent the vehicle M can therefore be lightened in weight. In addition, since wiring the harness becomes easy, the work to assemble the vehicle can also be improved.

Further, the ECU 40 is fixedly held on the outer wall surface of the casing 21 through the right and left support member 51, 52 with a space made between itself and the casing 21. Thus, although the heat generated by the electromagnetic type drive power transmission device 20 is conducted to the ECU 40 by way of the support members 51, 52, the air layer formed between the casing 21 and the ECU 40 insulates the ECU from the casing 21, and the air flowing through the air layer during the vehicle traveling cools the ECU 40, the support member 51, 52 and casing 21.

In the foregoing first embodiment, the support means 50 is composed of the right and left support members 52, 51, there may be taken another construction wherein the chassis 41 is supported on the casing 21 through a joint area as small as possible by jointing a part of the bottom surface of the chassis 41 with the casing 21. For example, as shown in FIGS. 6(a) and 6(b), this can be done by supporting the chassis 41 with a rear support member 53. This member 53 is formed to be slender and is fixed to the rear edge of the bottom surface of the chassis 41 of the ECU 40. Thus, the ECU 40 can be fixedly supported on the outer circumferential wall of the casing 21 of the electromagnetic type drive power transmission device 20 through the rear support member 53 with a space between itself and the casing 21. Also in this modified form, the rear support member 53 does not support the whole bottom surface of the chassis 41, but supports a part of the whole bottom surface. Therefore, the contact or joint area between the casing 21 of the electromagnetic type drive power transmission device 20 and the chassis 41 of the ECU 40 can be restrained to be as small as possible, at the same time of which a space as wide as possible can be formed between the casing 21 and the ECU 40. During the vehicle traveling, the air flows as arrowed in FIG. 6(a), so that the ECU 40 can be cooled also from the bottom surface thereof.

Further, in the foregoing first embodiment, the support means 50 is designed not to support the whole bottom surface of the chassis 41, but to support a part thereof. However, it may be designed to support the whole bottom surface of the chassis 41 through a support member 54, as shown in FIGS. 7(a) and 7(b). In this modified case, it is preferable to make the support member 54 of a heat insulator. The heat insulators utilized here include one which is constituted by laminating organic and inorganic insulators (for example, one which is made by piling up a glass fiber as reinforcement and a thermosetting resin (e.g., epoxy resin, phenol resin or the like) in the form of layers) and one which is made by laminating different inorganic insulators (for example, one which is made by mixing and pressing a glass fiber (short fiber) as reinforcement with cement and silicate calcium as bond under a high pressure). Thus, the ECU 40 can be secured to the casing 21 through the heat insulation member 54. Consequently, since the heat generated by the electromagnetic type drive power transmission device 20 is restrained by the heat insulation member 54 from being conducted to the ECU 40, the same can be prevented from rising to a high temperature.

Further, in each of the foregoing examples in the first embodiment, deflecting fins 55 may be arranged upstream of the ECU 40 secured to the casing 21, as shown in FIGS. 8(a) and 8(b). The deflecting fins 55 comprise a pair of outside fins 55a arranged to face each other and plural inside fins 55b arranged in parallel between the outside fins 55a and are secured to the outer circumference wall of the casing 21. The outside fins 55a spread outward as they go forward and gather the air effectively during the vehicle traveling. With this configuration, the air which flows to come from the forward side of the vehicle M is caught and deflected effectively toward the ECU 40 during the vehicle traveling, whereby the ECU 40 can be cooled effectively. The deflecting fins 55 may be secured to the vehicle body instead of being secured to the casing 21. Further, where the ECU 40 is secured to the underside of the casing 21 of the electromagnetic type drive power transmission device 20, it is restrained from being affected by the heat which is generated in the electromagnetic type drive power transmission device 20 while the vehicle M remains stopped.

Although in the foregoing first embodiment, the present invention is applied to the clutch mechanism for transmitting to the rear wheels Wrr, Wrl the drive power transmitted from the engine 10 to the front wheels Wfr, Wrl, it may be applied to a clutch mechanism for transmitting to the front wheels Wfr, Wfl the drive power transmitted from the engine 10 to the rear wheels Wrr, Wrl. Further, the drive power source for the vehicle M is not limited to the engine 10 and may be an electric motor.

(Second Embodiment)

A drive power transmission control device in a second embodiment according to the present invention will be described with reference to FIGS. 10 to 15. FIG. 10 shows a general construction of a four-wheel drive vehicle in the second embodiment. In FIG. 10, the four-wheel drive vehicle 101 is provided with an engine 102 in the form of a combustion engine and a transaxle 103. The transaxle 103 incorporates therein a transmission 103a, a front differential gear 103b, a transfer 103c and the like. The front differential gear 103b is connected to a pair of right and left front axles 104b, 104a, to which front wheels 105b, 105a are connected respectively. Accordingly, the drive power of the engine 102 is transmitted to the front wheels 105b, 105a through the transmission 103a, the front differential gear 103b and the right and left front transaxles 104b, 104a.

Further, the transfer 103c is connected to a propeller shaft 106, which is drivingly connected in turn to a drive power transmission device 107. Thus, the drive power of the engine 102 is transmitted to the drive power transmission device 107 through the transfer 103c and the propeller shaft 106. The drive power transmission device 107 is connected to a rear differential gear 109 through a drive pinion shaft 108, and the rear differential gear 109 is connected to right and left rear axles 110b 110a, to which the rear wheels 111b, 111a are connected respectively.

The drive power transmission device 107 is provided with an electromagnetic clutch mechanism of the multiple wet plate type which takes the same construction as that shown in FIG. 3, and the electromagnetic clutch mechanism has plural clutch plates which are engageable and disengageable with one another when attracted by an electromagnetic coil 107a shown in FIG. 11. The clutch plates are brought into friction engagement in proportion to the magnitude of electric current which is supplied to the electromagnetic coil 107a based on a control signal (command value) from an electronic control unit (hereafter as "ECU") 121 for drive power distribution, and the drive power of the propeller shaft 106 is transmitted to the drive pinion shaft 108 by the drive power transmission device 107 which is filled with lubricant oil for protection of the clutch plates.

More specifically, the drive power which is transmitted from the propeller shaft 106 (i.e., from the engine 102) to the drive pinion shaft 108 (i.e., to the rear wheels 111a, 111b) depends on the friction engagement force of the clutch plates and becomes large as the friction engagement force is increased. The friction engagement force depends on the magnitude of the electric current supplied to the electromagnetic coil 107a. Thus, by having the friction engagement force controlled, the drive power transmission device 107 selects either of a four-wheel drive state and a two-wheel drive state and controls the distribution ration of the drive power between the front wheels 105a, 105b and the rear wheels 111a, 111b in the four-wheel drive state.

The electric construction of a drive power transmission control circuit for drivingly controlling the drive power transmission device 107 will be described with reference to FIG. 11. The drive power transmission control circuit is provided with the drive power transmission electronic control unit or ECU 121. The drive power transmission ECU 121 is composed of a CPU 122, a ROM 123, a RAM 124, an input/output circuit 125, a drive circuit 135 and a bus line 126 connecting these components. The CPU 22 executes various kinds of operation processing for controlling the driving of the drive power transmission device 107, that is, the application of electric current to the electromagnetic coil 107a in accordance with various programs shored in the ROM 123. The ROM 123 has stored therein the various programs, various data and various data maps for controlling the application of electric current to the electromagnetic coil 107a of the drive power transmission device 107. The RAM 124 stores results of the operation processing executed by the CPU 122 and also stores data of various kinds.

The CPU 122 is connected through the input/output circuit 125 to a throttle opening-degree sensor 132 incorporated in a throttle valve (not shown) of the motor vehicle 101. The CPU 122 calculates the opening degree (throttle opening degree) of the throttle valve based on a detection signal from the throttle opening-degree sensor 132.

The CPU 122 is further connected through the input/output circuit 125 to wheel speed sensors 133a to 133d for detecting the rotations of the front wheels 105a, 105b and the rear wheels 111a, 111b. The CPU 122 inputs thereinto the detection signals from the wheel speed sensors 133a to 133d and calculates the wheels speeds of the front wheels 105a, 105b and the rear wheels 111a, 111b. The CPU 122 also calculates an average front wheel speed from the wheel speeds of the front wheels 105a, 105b and an average rear wheel speed from the wheel speeds of the rear wheels 111a, 111b. The CPU 122 further calculates a differential rotational speed which is the absolute value of the difference between the average front wheel speed and the average rear wheel speed.

The CPU 122 is also connected through the input/output circuit 125 and a sensor signal processing circuit 137 to a temperature sensor 134 incorporated in the ECU 121. The CPU 122 inputs thereinto a detection signal from the temperature sensor 134 and executes calculations to estimate the temperature of the lubricant oil filled in the drive power transmission device 7, in dependence upon the result which can be obtained by processing the detection signal through the sensor signal processing circuit 137.

The CPU 122 is further connected through the input/output circuit 125 to a drive circuit 135 for applying electric current to the electromagnetic coil 107a of the drive power transmission device 107. The CPU 122 outputs a duty ratio control signal for supplying the electromagnetic coil 107a with electric current of the value which the CPU 122 calculates. The drive circuit 135 drives the electromagnetic coil 107a based on the duty ratio control signal thereby to supply the electromagnetic coil 107a with electric current of the value calculated by the CPU 122.

The programs of various kinds stored in the ROM 123 include a control program for electric current application. The control program for electric current application is a program which calculates an electric current value to be supplied to the electromagnetic coil 107a in dependence on the traveling state at that moment in either of the two-wheel drive mode and the four-wheel drive mode and which controls the value of electric current applied to the electromagnetic coil 107a through the input/output circuit 125.

That is, when the driver sets a mode selector switch 131 to the four-wheel drive mode, the CPU 122 obtains as a duty ratio a target electric current value to be applied to the electromagnetic coil 107a from the data maps for the four-wheel drive mode based on a throttle opening-degree, the differential rotational speed, the vehicle speed and the oil temperature which have been calculated. Then, the CPU 122 outputs a duty ratio control signal corresponding to the duty ratio so obtained to the drive circuit 135 through the input/output circuit 135.

On the other hand, when the driver sets the mode selector switch 131 to the two-wheel drive mode, the CPU 122 operates in the two-wheel drive mode. Thus, the CPU 122 discontinues applying electric current to the electromagnetic coil 107a thereby to make the foregoing friction engagement force "0", whereby the distribution ratio of the drive power is controlled for the two-wheel drive mode.

Next, description will be made as to the way of mounting the drive power distribution ECU 121 on the drive power transmission device 107. The drive power distribution ECU 121 will be described in the beginning.

FIGS. 12(*a*) and 12(*b*) show the appearance of the drive power distribution ECU 121. FIG. 12(*a*) is a top plan view, while FIG. 12(*b*) is a side view taken from the side with connectors 143, 144. A chassis 151 made of a resin of the drive power distribution ECU 121 has brackets 141*a* and 141*b*, which are bodily formed therewith with the same material as the chassis 151, as shown in FIGS. 12(*a*) and 12(*b*). A lid 150 may be made of a resin or of a metal.

FIG. 13 shows one example of the interior construction of the drive power distribution ECU 121. Together with circuit components which are necessary for drive control of the drive power distribution device 107 and for other controls, the temperature sensor 134 is mounted on a printed board 148.

FIG. 14 is an explanatory view showing an example of mounting the drive power distribution ECU 121 on the drive power transmission device 107. The drive power distribution ECU 121 is mounted at their brackets 141*a*, 141*b* on the drive power transmission device 107 by means of bolts 146*a*, 146*b* and spacer collars 145*a*, 145*b*.

FIG. 15(*a*) is a fragmentary view partly in section of the drive power distribution ECU 121 taken along the line X–X' in FIG. 13 for showing the way of mounting the drive power distribution ECU 121 in detail. The collar 145*a*, made of a metal, and a bus bar 147 are formed embeded in the bracket 141*a* in an insert forming method known as, e.g., Insert Injection Molding. When so formed, the collar 145*a* and the bus bar 147 are kept contacted to each other for heat conduction. In a modified form, the collar 145*a* and the bus bar 147 may be manufactured as a one-piece component. One end of the bus bar 147 inside the chassis 151 is arranged to be put between an inner sidewall of the chassis 151 of the drive power distribution ECU 121 and the temperature sensor 134 and is kept in contact with the temperature sensor 134.

Where matching or balancing is not made between a characteristic (detectable temperature range) of the temperature sensor 134 and heat information conveyed from the bus bar 147, in other words, where the heat conducted from the bus bar 147 exceeds the upper limit of the detectable temperature range, measures may be taken by inserting between the temperature sensor 134 and the bus bar 147*a* member such as, for example, a resin plate or the like which is capable of diminishing the effect of thermal conduction, thereby to enable the oil temperature to be detected accurately. Further, where the temperature inside the chassis 151 rises beyond that predicted because the bus bar 147 has a large area exposed to inside the chassis 151, it can be done to make the area of the bus bar 147 exposed to inside the chassis 151 the minimum as required, so that the heat radiation from the bus bar 147 can be restrained.

In the foregoing second embodiment, the bus bar 147 is constituted by bending a plate-like conductor to a shape which is suitable for the insert forming (i.e., Insert Injection Molding) into the bracket 141*a*. Thus, the shape of the bus bar 147 depends on the shape of the bracket 141*a*. In addition, the shape of the conductor to be used as the bus bar 147 can be taken as any other shape (e.g., bar-like shape) so far as it can convey effective heat information to the temperature sensor 134 without making substantial difficulties arising in the insert forming.

The collar 145*a* is constituted by bending a metal plate into a cylindrical shape as shown in FIG. 15(*b*). When the drive power distribution ECU 121 is mounted on the drive power transmission device 107, the collar 145*a* is fixed to the drive power transmission device 107 with the bolt 146*a* inserted to pass therethrough. There is no particular requirement to, or no restraint on, the machining method of the metal plate.

Next, description will be made concerning the state of heat conduction from the drive power transmission device 107 to the temperature sensor 134. Referring back to FIG. 11, the value of electric current which is to be applied to the electromagnetic coil 107*a* at that moment in either of the two-wheel drive mode and the four-wheel drive mode is calculated in accordance with the electric current application control program stored in the ROM 123. When the application of the electric current to the electromagnetic coil 107*a* is controlled to meet the calculated electric current value, the drive power transmission device 107 controls the friction engagement force of the clutch plates. This friction engagement force causes the lubricant oil filled in the drive power transmission device 107 to rise in temperature, which is in turn accompanied by the temperature increase in the housing 136.

The heat of the housing 136 is conducted to the collar 145*a* and is further conducted through the bus bar 147 to the temperature sensor 134. The temperature sensor 134 estimates the temperature of the lubricant oil inside the drive power transmission device 7 on the basis of the temperature of the bus bar 147.

The temperature of the lubricant oil detected by the temperature sensor 134 (i.e., the temperature of the bus bar 147) is different from an actual temperature of the lubricant oil. This is attributed to the losses in conduction (i.e., heat radiations) of the housing 136, the collar 145*a* and the bus bar 147. This defect can be cured by obtaining the correlation between actual temperatures of the lubricant oil through the actual, direct detection and those temperatures detected by the temperature sensor 134, storing the correlation in the ROM 123 in the form of a data map, and estimating the actual temperature of the lubricant oil by the use of the data map during the execution of a lubricant oil temperature detection program. Alternatively, the correlation can be obtained theoretically from the thermal characteristics of those materials which constitute the housing 136, the collar 145*a* and the bus bar 147.

Although in the foregoing second embodiment, the drive power transmission device 107 is housed in the same case as the rear differential gear 109 is contained in, it may be arranged at the mid portion of the propeller shaft 106, or may be housed in the same case as the transfer 103*c* is contained in.

Various features and many of the attendant advantages in the foregoing embodiments will be summarized as follows:

In the foregoing first embodiment typically shown in FIGS. 1, 2(*a*) and 2(*b*) for example, the drive power transmission control device A is provided, wherein the electronic control device (ECU) 40 is provided bodily on the electromagnetic type drive power transmission device 20 as construed above. This makes it possible to adjust as a whole nonuniformity or deflection in mechanical quality of the electromagnetic type drive power transmission device 20 and nonuniformity or deflection in electrical quality of the electronic control device 40, so that the control performance in drive power transmission can be improved. Further, since the electronic control device 40 which used to be arranged remote from the electromagnetic type drive power transmission device 20 in the prior art is bodily united therewith, a harness for connecting the both components 20, 40 can be shortened, by which extent the weight of the vehicle M can be lightened.

Also in the foregoing first embodiment typically shown in FIGS. 2(*a*), 2(*b*), 6(*a*) and 6(*b*) for example, since the electronic control device 40 is fixedly supported on the outer wall of the casing 21 through the support means 50 (e.g., support members 51, 52 or 53) with a space made between itself and the casing 21. With this construction, though during the vehicle traveling, the heat generated by the electromagnetic type drive power transmission device 20 is conducted through the support means 50 to the electronic control device 40, the casing 21 and the electronic control device 40 can be insulated from each other by the air layer formed therebetween, and the electronic control device 40, the support means 50 and the casing 21 can be effectively cooled by the air flowing through the air layer.

Also in the foregoing first embodiment shown in FIGS. 7(*a*) and 7(*b*) for example, since the electronic control device 40 is fixed on the casing 21 through the heat insulating member 54, the heat generated by the electromagnetic type drive power transmission device 20 is restrained by the heat insulating member 54 from being conducted to the electronic control device 40, so that the same can be prevented from being heated to a high temperature.

Also in the foregoing first embodiment shown in FIGS. 8(*a*) and 8(*b*) for example, deflection fin means 55 is arranged upstream of the electronic control device 40 fixed on the casing 21. With this construction, during the vehicle traveling, since the deflection fin means 55 gathers the air which flows to come from the forward side of the vehicle M and directs the air toward the electronic control device 40, so that the same can be cooled effectively.

Further, in the foregoing first embodiment shown in FIG. 4, the electronic control device 40 is arranged on the casing 21 so that the heat generation element 46 (i.e., switching element) inside the electronic control device 40 is located upstream of air flow. With this construction, the air which flows to come from the forward side of the vehicle M directly hits on the heat generation portion of the electronic control device 40, so that the same can be cooled effectively.

In the foregoing second embodiment typically shown in FIGS. 13 to 15 for example, since the temperature sensor 134 is incorporated in the electronic control device (ECU) 121 instead of being assembled into the drive power transmission device 107, it becomes unnecessary to take out one or more leads (i.e., cable or harness), extending from output terminals of the temperature sensor 134, from the housing 136 of the drive power transmission device 107. Thus, it becomes unnecessary to machine any hole on the housing 136 for attaching the temperature sensor 134, and it also becomes unnecessary to use any sealing member between the leads and the housing 136 so as to prevent foreign matter such as, e.g., water, dust or the like from entering the inside of the housing 136. Accordingly, the housing 136 of the drive power transmission section 107 is simplified in construction, so that the manufacturing cost therefor can be reduced. In addition, the cable or harness for connecting the temperature sensor 134 with the ECU 121 becomes unnecessary, and the cost for the harness and the cost for assembling the same can also be reduced.

Furthermore, because the cable or harness which used to be provided in the prior art for connecting the temperature sensor 134 incorporated inside the drive power transmission device 107 with the ECU 121 becomes unnecessary, it can be realized to decrease the number of connector pins for connecting the drive power transmission device 107 with the ECU 121. As a consequence, the connector can be miniaturized and the cost therefor can be reduced. Further, it can be obviated that the resistance which the cable or harness has within itself and the friction resistance which is made between male and female connectors adversely influence on the temperature sensor (thermal resistance element) 134, so that reliability can be enhanced on the detection value of the temperature sensor 134.

Additionally, since the drive power transmission device 107 and the temperature sensor 134 are connected by means of the heat conduction path 147, there can be solved a problem that noise which is caused by the connection using a cable or harness adversely affects the reliability of the detected temperature in the prior art. Further, because the temperature sensor 134 is inside the ECU 121, only reviewing the wiring or the arrangement of components on the printed board 148 of the ECU 121 becomes sufficient as measures which may be attempt to cope with such noise. Thus, unlike in the prior art, it is unnecessary either to use a cable with anti-noise capability like a sealed cable incurring a substantial increase in cost, nor to do a time-consuming review for the arrangement of the cable. Since an anti-noise experiment can be done by using the ECU 121 only without using any vehicle therefor, freedom can be heightened in scheduling the development and evaluation of the ECU 121. This advantageously results in shortening the time period for the development as well as in reducing the cost for the development.

Also in the foregoing second embodiment typically shown in FIG. 15(*a*) for example, the heat conduction portion in the drive power distribution control device for the vehicle 101 can take the construction to conduct the heat generated by the drive power transmission device 107 to the temperature sensor 134. This can be practiced by uniting or integrating the heat conduction member 147 made of a metal with the bracket 141*a* in the insert forming method and by attaching the heat conduction member 147 so that the same is able to conduct heat between the drive power transmission device housing 136 containing the drive power transmission device 107 therein and the temperature sensor 134.

The heat conduction member 147 used in the second embodiment can be easily designed to be thicker and larger in strength than a conventional cable. Thus, the heat conduction member 147 is smaller in the probability to break than the conventional cable, which advantageously makes the chance to failure or fault smaller. In the prior art construction, all of the temperature sensor 134, the cable and the ECU 121 had to be checked when a fault takes place. In the present embodiment, on the contrary, the cause of such a fault can be easily found only by checking the ECU 121 thanks to the temperature sensor 134 incorporated inside the ECU 121 side as well as thanks to the heat conduction member 147 being integrated with the ECU 121. Accordingly, the time period needed for finding the cause of such a fault can be shortened.

Further, since the heat conduction portion in the second embodiment is constituted by integrating the metallic heat conduction member 147 in the bracket 141*a* in the insert forming method, no substantial influence is exerted on the manufacturing process for the ECU 121. Since the assembling the ECU 121 to the vehicle bodily simultaneously results in fixing the heat conduction member 147 to the vehicle body, the work load in assembling the ECU 121 does not increase.

Also in the foregoing second embodiment shown in FIG. 11, the drive power distribution control device can take the construction to control the drive power transmission device 107 based on the signal which has been processed by the sensor signal processing circuit 137. The drive power transmission device 107 controls the friction engagement force of the clutch plates by driving the electromagnetic coil 107a. The temperature increase of the electromagnetic coil 107a and the temperature increase of the lubricant oil filled in the drive power transmission device 107 caused by the friction engagement force result in lowering the viscosity of the lubricant oil (i.e., weakening the viscosity). This causes the torque transmitted between the clutch plates to vary. Then, because the drive power by the wheels decreases somewhat, the driver has a strange feeling and further steps on an accelerator in the attempt to get a desired drive power. This would undesirably lead to the deterioration in the fuel consumption as well as to the failure of the drive power transmission device 107 by the cause of an extraordinary rise of the oil temperature. Therefore, with this construction, since the lubricant oil temperature is observed all the time, the control of the drive power can be done to meet the driver's demand, so that the failure of the drive power transmission device 107 can be obviated.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive power transmission control device comprising:
    an electromagnetic type drive power transmission device containing in a casing a clutch mechanism for transmitting drive power, transmitted from a drive power source of a vehicle to either front wheels or rear wheels, to the remaining wheels and an electromagnetic coil for controlling the torque transmitted by the clutch mechanism; and
    an electronic control device for controlling electric current applied to the electromagnetic coil of the electromagnetic type drive power transmission device;
    wherein the electronic control device is provided bodily on the exterior side of the casing of the electromagnetic type drive power transmission device,
    wherein the electronic control device is fixedly supported on an outer wall of the casing with a space between the electronic control device and the casing, such that cooling air can flow between the outer wall of the casing and the electronic control device.

2. The drive power transmission control device as set forth in claim 1, further comprising:
    deflection fin means arranged upstream of the electronic control device fixed to the casing.

3. The drive power transmission control device as set forth in claim 1, wherein the electronic control device contains a heat generation element therein and is fixed to the casing to position the heat generation element upstream of the air flow which is produced during the vehicle traveling.

* * * * *